(12) United States Patent
Hwang

(10) Patent No.: US 11,183,053 B2
(45) Date of Patent: Nov. 23, 2021

(54) VEHICLE AND METHOD OF CONTROLLING THE SAME

(71) Applicants: Hyundai Motor Company, Seoul (KR); Kia Motors Corporation, Seoul (KR)

(72) Inventor: Yonghwan Hwang, Whasung-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 262 days.

(21) Appl. No.: 16/522,516

(22) Filed: Jul. 25, 2019

(65) Prior Publication Data

US 2020/0193817 A1    Jun. 18, 2020

(30) Foreign Application Priority Data

Dec. 18, 2018 (KR) .................. 10-2018-0164544

(51) Int. Cl.
| | |
|---|---|
| G08G 1/04 | (2006.01) |
| G01S 7/524 | (2006.01) |
| G01S 17/48 | (2006.01) |
| G08G 1/16 | (2006.01) |
| G01S 13/931 | (2020.01) |
| G01C 21/26 | (2006.01) |
| B60K 31/00 | (2006.01) |

(Continued)

(52) U.S. Cl.
CPC .......... *G08G 1/04* (2013.01); *B60K 31/0008* (2013.01); *B60R 11/0235* (2013.01); *G01C 21/265* (2013.01); *G01S 7/524* (2013.01); *G01S 13/931* (2013.01); *G01S 17/48* (2013.01); *G08G 1/166* (2013.01); *H04B 1/3822* (2013.01); *H04R 3/005* (2013.01); *B60K 2031/0016* (2013.01); *B60T 2201/022* (2013.01)

(58) Field of Classification Search
CPC ........ G08G 1/04; G08G 1/166; G01C 21/265; H04R 3/005; H04B 1/3822; B60R 11/0235; B60K 2031/0016; B60K 31/0008; B60T 2201/022; G01S 5/28; G01S 11/14; G01S 5/18; G01S 7/524; G01S 17/48; G01S 13/931
See application file for complete search history.

(56) References Cited

U.S. PATENT DOCUMENTS

| | | | |
|---|---|---|---|
| 2013/0188794 A1* | 7/2013 | Kawamata | G08G 1/163 381/56 |
| 2016/0171806 A1* | 6/2016 | Van Dyken | G07C 9/37 367/199 |
| 2017/0213459 A1* | 7/2017 | Ogaz | G08G 1/166 |

* cited by examiner

*Primary Examiner* — Marthe Y Marc-Coleman
(74) *Attorney, Agent, or Firm* — Morgan, Lewis & Bockius LLP

(57) ABSTRACT

A vehicle may include a speaker; a display; a plurality of microphones configured to receive sound waves outside the vehicle; and a controller connected to the speaker, the display, and the plurality of microphones, and configured to determine sound wave characteristics of a terrain around a road on which the vehicle travels, based on map information, to determine a direct wave and a reflected wave of the received sound waves based on the terrain, the determined sound wave characteristics of the terrain, and the received sound waves, to determine a position and a velocity of an object that has generated the received sound waves based on the direct wave and the reflected wave, and to control at least one of the speaker and the display to output information on the position and the velocity of the object.

22 Claims, 9 Drawing Sheets

(51) Int. Cl.
*H04R 3/00* (2006.01)
*H04B 1/3822* (2015.01)
*B60R 11/02* (2006.01)

VEHICLE AND METHOD OF CONTROLLING THE SAME

CROSS-REFERENCE TO RELATED APPLICATION(S)

The present application claims priority to Korean Patent Application No. 10-2018-0164544, filed on Dec. 18, 2018, the entire contents of which is incorporated herein for all purposes by this reference.

BACKGROUND OF THE INVENTION

Field of the Invention

Embodiments of the disclosure relate to a vehicle capable of identifying an object located in the vicinity using a plurality of microphones, and a method of controlling the vehicle.

Description of Related Art

Generally, a vehicle can identify an object located in the vicinity based on a surrounding image photographed through a camera provided in the vehicle.

However, there may be a limit to the identification of objects through surrounding images. For example, if the object is not captured due to obstacles, or if the object is not identified according to the dark environment, it may be impossible to identify the object through the surrounding image, and the probability of collision with the object may increase.

Furthermore, the vehicle can identify the object located in the vicinity based on radar data acquired through a radar provided in the vehicle. However, the identification of the object through the radar data may also cause a problem in that the accuracy is lowered in a situation where the object is obstructed by an obstacle.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle for determining a position, velocity, and type of an object by receiving sound waves generated by the object using a plurality of microphones, and a method of controlling the vehicle.

In accordance with an aspect of the disclosure, a vehicle may include: a speaker; a display; a plurality of microphones configured to receive sound waves outside the vehicle; and a controller connected to the speaker, the display, and the plurality of microphones, and configured to determine sound wave characteristics of a terrain around a road on which the vehicle travels, based on map information, to determine a direct wave and a reflected wave of the received sound waves based on the terrain, the determined sound wave characteristics of the terrain, and the received sound waves, to determine a position and a velocity of an object that has generated the received sound waves based on the direct wave and the reflected wave, and to control at least one of the speaker and the display to output information on the position and the velocity of the object.

The controller may be configured to determine a path of the direct wave and a path of the reflected wave of the received sound waves from the object based on the terrain, the determined sound wave characteristics of the terrain, and the received sound waves.

The controller may be configured to determine sound wave characteristics for a left terrain and a right terrain around the road based on a running direction of the vehicle based on the map information, and determine the path of the direct wave and the path of the reflected wave based on the terrain, the sound wave characteristics for the left terrain, the sound wave characteristics for the right terrain, and the received sound waves.

The controller may be configured to determine the path of the direct wave and the path of the reflected wave based on at least one of a magnitude and a received time of each of the sound waves received through each of the plurality of microphones.

The controller may be configured to determine a first sound wave as the direct wave, and determine a second sound wave as the reflected wave, when receiving the second sound wave after receiving the first sound wave through the plurality of microphones, the second sound wave having the same frequency as the first sound wave and having a magnitude smaller than a magnitude of the first sound wave after receiving the first sound wave.

The controller may be configured to determine the position of the object based on a difference value of propagation time between the direct wave and the reflected wave, the path of the direct wave, and the path of the reflected wave.

The controller may be configured to determine a distance between the vehicle and the object on the path of the reflected wave based on the difference value of propagation time between the direct wave and the reflected wave and a velocity of the sound waves in the air, determine a direction in which the object is located from the vehicle based on the path of the direct wave, and determine the position of the object based on the determined distance between the vehicle and the object and the determined direction in which the object is located.

The controller may be configured to determine the velocity of the object based on a change amount in a difference value of propagation time between the direct wave and the reflected wave for a unit time.

The controller may be configured to determine the velocity of the object based on at least one of a change amount in propagation time between the direct waves received sequentially in time and a change amount in the position of the object.

The controller may be configured to determine a type of the object that has generated the received sound waves based on the received sound waves and a database for the generated sound waves per object type.

The controller may be configured to control at least one of the speaker and the display to output information on the determined type of the object.

In accordance with another aspect of the disclosure, a method of controlling a vehicle that may include a speaker, a display and a plurality of microphones configured to receive sound waves outside the vehicle, the method including: determining sound wave characteristics of a terrain around a road on which the vehicle travels, based on map information; determining a direct wave and a reflected wave of the received sound waves based on the terrain, the determined sound wave characteristics of the terrain, and the received sound waves; determining a position and a velocity of an object that has generated the received sound waves based on the direct wave and the reflected wave; and controlling at least one of the speaker and the display to output information on the position and the velocity of the object.

The method may further comprise: determining a path of the direct wave and a path of the reflected wave of the received sound waves from the object based on the terrain, the determined sound wave characteristics of the terrain, and the received sound waves.

The determining of the path of the direct wave and the path of the reflected wave may include determining sound wave characteristics for a left terrain and a right terrain around the road based on a running direction of the vehicle based on the map information; and determining the path of the direct wave and the path of the reflected wave based on the terrain, the sound wave characteristics for the left terrain, the sound wave characteristics for the right terrain, and the received sound waves.

The determining of the path of the direct wave and the path of the reflected wave may include determining the path of the direct wave and the path of the reflected wave based on at least one of a magnitude and a received time of each of the sound waves received through each of the plurality of microphones.

The determining of the direct wave and the reflected wave of the received sound waves may include determining a first sound wave as the direct wave, and determining a second sound wave as the reflected wave, when receiving the second sound wave after receiving the first sound wave through the plurality of microphones, the second sound wave having the same frequency as the first sound wave and having a magnitude smaller than a magnitude of the first sound wave after receiving the first sound wave.

The determining of the position of the object may include determining the position of the object based on a difference value of propagation time between the direct wave and the reflected wave, the path of the direct wave, and the path of the reflected wave.

The determining of the position of the object may include determining a distance between the vehicle and the object on the path of the reflected wave based on the difference value of propagation time between the direct wave and the reflected wave and a velocity of the sound waves in the air; determining a direction in which the object is located from the vehicle based on the path of the direct wave; and determining the position of the object based on the determined distance between the vehicle and the object and the determined direction in which the object is located.

The determining of the velocity of the object may include determining the velocity of the object based on a change amount in a difference value of propagation time between the direct wave and the reflected wave for a unit time.

The determining of the velocity of the object may include determining the velocity of the object based on at least one of a change amount in propagation time between the direct waves received sequentially in time and a change amount in the position of the object.

The method may further comprise: determining a type of the object that has generated the received sound waves based on the received sound waves and a database for the generated sound waves per object type.

The method may further comprise: controlling at least one of the speaker and the display to output information on the determined type of the object.

According to one aspect of the disclosure, objects may be more accurately identified, even if the object does not enter a driver's field of view depending on obstacles, terrain, and type of road, by use of the plurality of microphones to receive the sound waves generated by the object and to determine the position, velocity and type of the object.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
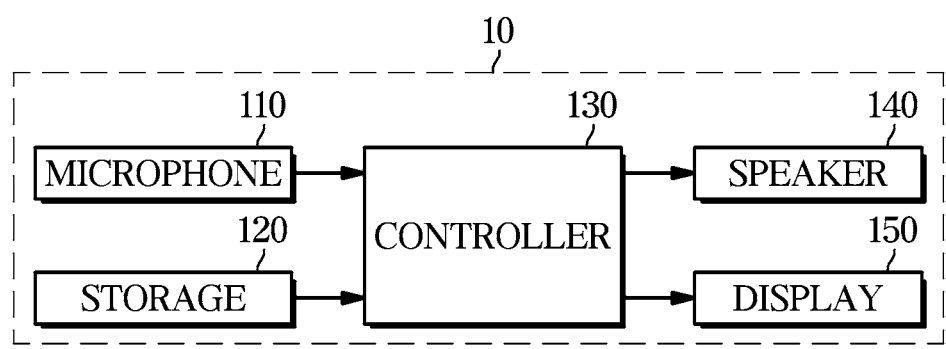
FIG. 1 is a control block diagram of a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Like numbers refer to like elements throughout the present specification. This specification does not describe all components of the embodiments, and general information in the Field of the Invention to which the disclosure belongs or overlapping information between the exemplary embodiments will be omitted.

It will be understood that when a component is referred to as being "connected" to another component, it may be directly or indirectly connected to the other component. When a component is indirectly connected to another component, it may be connected to the other component through a wireless communication network.

Also, it will be understood that the terms "includes," "comprises," "including," and/or "comprising," when used in the exemplary embodiment, specify the presence of a stated component, but do not preclude the presence or addition of one or more other components.

Also, it is to be understood that the singular forms "a," "an," and "the" include plural referents unless the context clearly dictates otherwise.

As used herein, the terms "portion," "unit," "block," "member," or "module" refer to a unit that can perform at least one function or operation. For example, these terms may refer to at least one piece of software stored in a memory or at least one piece of hardware, such as a Field Programmable Gate Array (FPGA) or an Application Specific Integrated Circuit (ASIC), or at least one process which is processed by a processor.

Reference numerals used in operations are provided for convenience of description, without describing the order of the operations, and the operations may be executed in a different order from the stated order unless a specific order is definitely specified in the context.

Hereinafter, embodiments of a vehicle according to an aspect and a method of controlling the vehicle will be described in detail with reference to the accompanying drawings.

FIG. 1 is a control block diagram of a vehicle according to an exemplary embodiment of the present invention.

Referring to FIG. 1, a vehicle 10 may include a microphone 110 for receiving sound waves generated outside the vehicle 10, a storage unit 120 for storing various types of information necessary for controlling the vehicle 10, a controller 130 for identifying an object located in the periphery of the vehicle 10 based on the received sound waves, a speaker 140 for audibly outputting the information related to the identified object, and a display 150 that visually outputs information related to the identified object.

The microphone 110 according to an exemplary embodiment of the present invention may receive sound waves, which are generated outside the vehicle 10.

To the present end, the microphone 110 may be provided on one side of an external body of the vehicle 10. The microphone 110 may be provided on a front bumper of the vehicle 10. Furthermore, the microphone 110 may be provided on a rear bumper of the vehicle 10, or may be provided on a door of the vehicle 10.

However, a position of the microphone 110 is not limited to the above example, and may be included in any position on the external body that can receive sound waves generated from the outside of the vehicle 10, without limitation.

Furthermore, a plurality of microphones 110 may be provided. Each of the plurality of microphones 110 may receive sound waves outside the vehicle, and the controller 130 may determine the direction of the object generating the received sound waves based on at least one of the magnitude of the received sound waves and the received time of the received sound waves. At the instant time, the direction of the object may correspond to the direction determined based on the vehicle 10. The configuration for determining the direction of the object will be described in detail later.

The storage unit 120 according to an exemplary embodiment of the present invention may store various information necessary for controlling the vehicle 10.

The storage unit 120 may store map information including information on a traveling road on which the vehicle 10 travels and its surrounding terrain.

Also, the storage unit 120 may store information on sound wave characteristics according to the type of the terrain. At the instant time, the information on the sound wave characteristics according to the type of the terrain may include information on reflection, transmission, and scattering of the sound waves reaching the corresponding terrain depending on the type of the terrain.

Also, the storage unit 120 may store a database for the generated sound waves per object type. At the instant time, the database for the generated sound waves per the object type may include information on the frequency and magnitude of the sound waves generated according to the type of the object.

Also, the type of the object may include vehicles, bicycles, and people. At the instant time, the vehicles may be distinguished according to the manufacturer, or may be distinguished according to the type (e.g., cars, trucks, coupes, etc.).

The storage unit 120 according to an exemplary embodiment of the present invention may correspond to a memory that stores the above-described information and the following information, may be implemented as at least one of a non-volatile memory device (for example, a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or a storage medium (for example, Hard Disk Drive (HDD) and Compact Disc Read Only Memory (CD-ROM)) for storing various information, although not limited to these.

The controller 130 according to an exemplary embodiment of the present invention may identify an object located in the periphery of the vehicle 10 based on the received sound waves.

The controller 130 may determine the sound wave characteristics of the terrain around the road on which the vehicle 10 travels based on the map information.

That is, the controller 130 may determine the sound wave characteristics of the terrain that indicates whether the terrain around the road on which the vehicle 10 travels reflects, transmits, and scatters sound waves based on the map information. At the instant time, the controller 130 may determine the sound wave characteristics corresponding to the terrain around the road to be driven based on the information related to the sound wave characteristics according to the type of the terrain.

The controller 130 may also determine direct waves and reflected waves of the received sound waves based on the terrain around the road on which the vehicle 10 travels, the determined sound wave characteristics of the terrain, and the received sound waves.

In the instant case, the direct wave may correspond to sound waves received from the object generating the sound waves without reflection by a peripheral terrain to the vehicle 10, and the reflected wave may correspond to sound waves received through reflection by the peripheral terrain from the object generating the sound waves to the vehicle 10.

The controller 130 may determine a first sound wave as the direct wave, and determine a second sound wave as the reflected wave, when receiving the second sound wave after receiving the first sound wave through the plurality of microphones 110, the second sound wave having the same frequency as the first sound wave and having a magnitude smaller than a magnitude of the first sound wave after receiving the first sound wave.

Furthermore, the controller 130 may determine the path of the direct wave and the path of the reflected wave of the received sound waves in consideration of the terrain surrounding the road on which the vehicle 10 travels and the determined sound wave characteristics of the terrain.

In the instant case, the path of the direct wave may correspond to a propagation path of sound waves corresponding to the direct waves, and the path of the reflected wave may correspond to a propagation path of sound waves corresponding to the reflected waves.

That is, the controller 130 may determine the path of the direct wave in which the received sound waves are transmitted to the vehicle 10 without reflection and a path of the reflected wave in which the received sound waves are reflected by the terrain and are transmitted to the vehicle 10 based on the terrain around the road and the sound wave characteristics of the terrain.

For example, the controller 130 may determine that the received sound waves are transmitted to the vehicle 10 along the road surrounding the terrain, and determine the road on which the vehicle 10 travels as a reflected wave path, when it is judged that the terrain around the road has sound wave characteristics reflecting the sound waves. Furthermore, the controller 130 may determine that the received sound waves pass through the terrain around the road and are transmitted to the vehicle, and may determine the path between the vehicle and the object that generates the sound waves as a direct wave path, when it is determined that the terrain around the road has the sound wave characteristics that transmits the sound waves.

Furthermore, the controller 130 may determine sound wave characteristics for a left terrain and a right terrain around the road based on a running direction of the vehicle based on the map information, and determine the path of the direct wave and the path of the reflected wave based on the terrain around the road on which the vehicle 10 travels, the sound wave characteristics for the left terrain, the sound wave characteristics for the right terrain, and the received sound waves.

That is, the controller 130 may predict a sound wave path of the direct wave which is transmitted through the terrain and received without reflection by the terrain and a sound wave path of the reflected wave reflected by the terrain based on the sound wave characteristics for the left terrain and the sound wave characteristics for the right terrain.

At the present time, the controller 130 may determine the path of the direct wave and the path of the reflected wave based on at least one of a magnitude and a received time of each of the sound waves received through each of the plurality of microphones 110.

For example, the controller 130 may determine that the object is located on the side where the microphone 110, receiving the sound waves having the largest magnitude among the plurality of microphones 110 or receiving the sound waves earliest among the plurality of microphones 110, is disposed, and may determine the path of the direct wave generated from the object based on the side where the microphone 110, receiving the sound waves having the largest magnitude among the plurality of microphones 110 or receiving the sound waves earliest among the plurality of microphones 110, is disposed, the terrain of the road on which the vehicle 10 travels, and the sound characteristics of the terrain. Furthermore, the controller 130 may determine another sound wave as a reflected wave, when receiving the another sound wave whose frequency is the same as that of the specific sound wave received and whose magnitude is reduced after receiving the specific sound wave, and may determine the path of the reflected wave based on the side surface on which the microphone 110 receiving the another sound wave is disposed, the surrounding terrain of the road on which the vehicle 10 travels, and the sound wave characteristics of the terrain.

Furthermore, the controller 130 determines a position and a velocity of an object that has generated the received sound waves based on the direct wave and the reflected wave.

The controller 130 may determine the position of the object based on a difference value of propagation time between the direct wave and the reflected wave, the path of the direct wave, and the path of the reflected wave.

That is, the controller 130 may determine a distance between the vehicle 10 and the object generating the sound waves on the path of the reflected wave based on the difference value of propagation time between the direct wave and the reflected wave and a velocity of the sound waves in the air, and may determine a direction in which the object is located from the vehicle 10 based on the path of the direct wave. At the instant time, the controller 130 may determine the position of the object based on the determined distance between the vehicle 10 and the object and the determined direction in which the object is located.

The controller 130 may determine the velocity of the object based on a change amount in a difference value of propagation time between the direct wave and the reflected wave for a unit time.

That is, the controller 130 may determine the relative velocity of the object with respect to the vehicle 10 based on the change amount in the unit time of the distance between the vehicle 10 and the object generating the sound waves, which is determined based on the difference value of propagation time between the direct wave and the reflected wave.

Furthermore, the controller 130 may determine the velocity of the object based on at least one of a change amount in propagation time between the direct waves received sequentially in time and a change amount in the position of the object.

Furthermore, the controller 130 may determine a type of the object that has generated the received sound waves based on the received sound waves and the database for the generated sound waves per the object type.

Furthermore, the controller 130 may control at least one of the speaker 140 and the display 150 to output information on the position and the velocity of the object. Furthermore, according to various aspects of the present invention, the controller 130 may control at least one of the speaker 140 and the display 150 to output information on the determined type of the object.

The controller 130 may include at least one memory storing a program for performing the above-described operations and operations, which will be described below, and at least one processor for executing the stored program. When there is a plurality of memories and processors, they may be integrated into one chip or provided at physically separated positions.

The speaker 140 according to an exemplary embodiment of the present invention may output the information related to the identified object audibly.

The speaker 140 may be provided within the vehicle 10 to output information related to the identified object to a user of the vehicle 10 audibly.

At the present time, the user of the vehicle 10 may be a driver or a passenger of the vehicle 10, and the information on the identified object may correspond to information on at least one of the position, velocity, and type of the object determined by the controller 130 based on the sound waves.

The location and the number of the speakers 140 may be included in any number and locations of the vehicle 10 that can transmit information to the user of the vehicle 10 audibly.

The display 150 according to an exemplary embodiment of the present invention may visually output information related to the identified object.

The display 150 may visually output information related to the identified object to the user of the vehicle 10. At the instant time, the information on the identified object may correspond to information on at least one of the position, velocity, and type of the object determined by the controller 130 based on the sound waves, as described above.

To the present end, the display 150 may be provided within the vehicle 10 and may include a panel.

The panel may be at least one of a cathode ray tube (CRT) panel, a liquid crystal display (LCD) panel, a light emitting diode (LED) panel, an organic light emitting diode (OLED) panel, a plasma display panel (PDP), and a field emission display (FED) panel.

The location and the number of the displays 150 may be included in any number and any number of locations that can visually convey information to the user of the vehicle 10.

Figure 2:
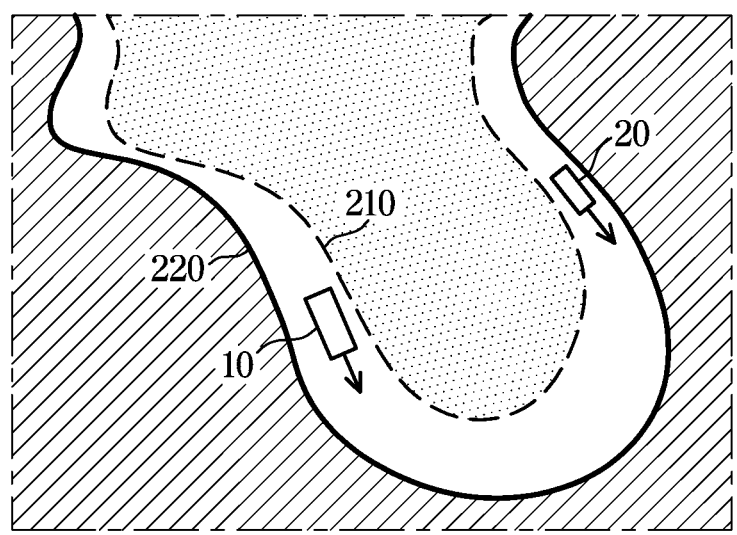
FIG. 2 is a view exemplarily illustrating a case where a vehicle determines sound wave characteristics with respect to a terrain around a road on which the vehicle travels, based on map information according to an exemplary embodiment of the present invention.

FIG. 2 is a view exemplarily illustrating a case where a vehicle determines sound wave characteristics with respect to a terrain around a road on which the vehicle travels, based on map information according to an exemplary embodiment of the present invention.

Referring to FIG. 2, the controller 130 according to an exemplary embodiment of the present invention may identify an object located in the periphery of the vehicle 10 based on the received sound waves.

To the present end, the controller 130, first, may determine the sound wave characteristics of the terrain around the road on which the vehicle 10 travels based on the map information.

That is, the controller 130 may determine the sound wave characteristics of the terrain that indicates whether the terrain around the road on which the vehicle 10 travels reflects, transmits, and scatters sound waves based on the map information.

At the present time, the controller 130 may determine the sound wave characteristics corresponding to the terrain around the road to be driven based on the information related to the sound wave characteristics according to the type of the terrain.

That is, if the terrain around the road corresponds to a terrain which is inclined in the direction of a higher altitude or includes obstacles that can reflect sound waves, the controller 130 may determine that the sound wave characteristic of the terrain reflects the sound waves.

Furthermore, the controller 130 may determine the sound wave characteristics for the left terrain and the right terrain around the road based on a running direction of the vehicle based on the map information.

For example, if a left terrain 210 corresponds to a terrain sloping in a direction of decreasing altitudes and a right terrain 220 corresponds to a sloping terrain in a direction of increasing altitude, the controller 130 may determine that the sound wave characteristics of the left terrain 210 are the sound wave characteristics that transmit the sound waves and that the sound wave characteristics of the right terrain 220 are the sound wave characteristics of reflecting the sound waves.

Figure 3:
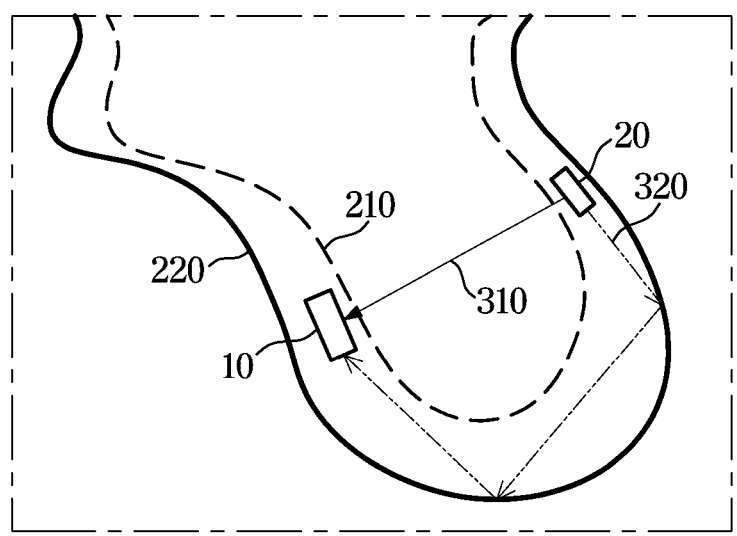
FIG. 3 is a view exemplarily illustrating a case where a vehicle determines a path of a direct wave and a path of a reflected wave of sound waves generated by an object based on sound wave characteristics of a terrain around a road according to an exemplary embodiment of the present invention.
Figure 4:
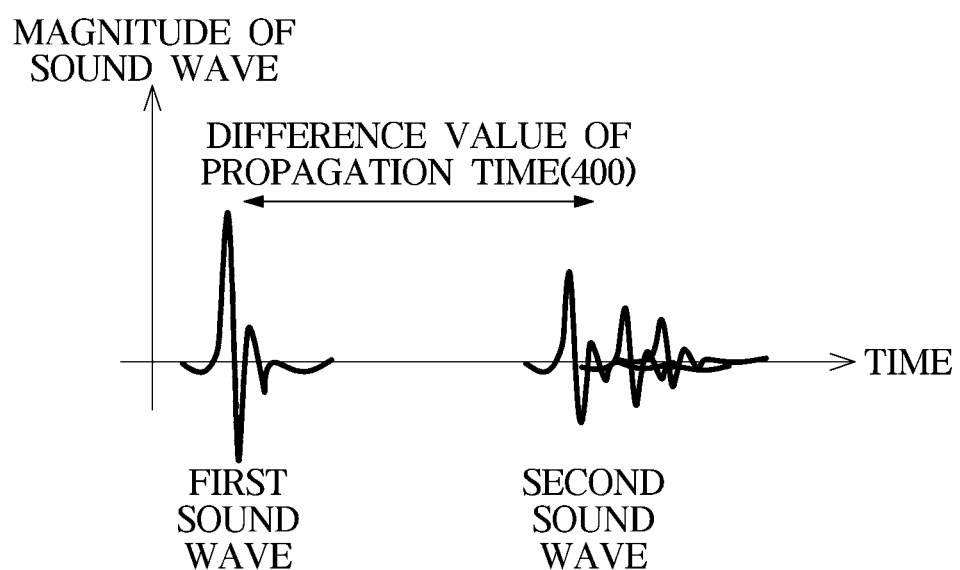
FIG. 4 is a view exemplarily illustrating a difference value of propagation time between a direct wave and a reflected wave according to an exemplary embodiment of the present invention.
Figure 5:
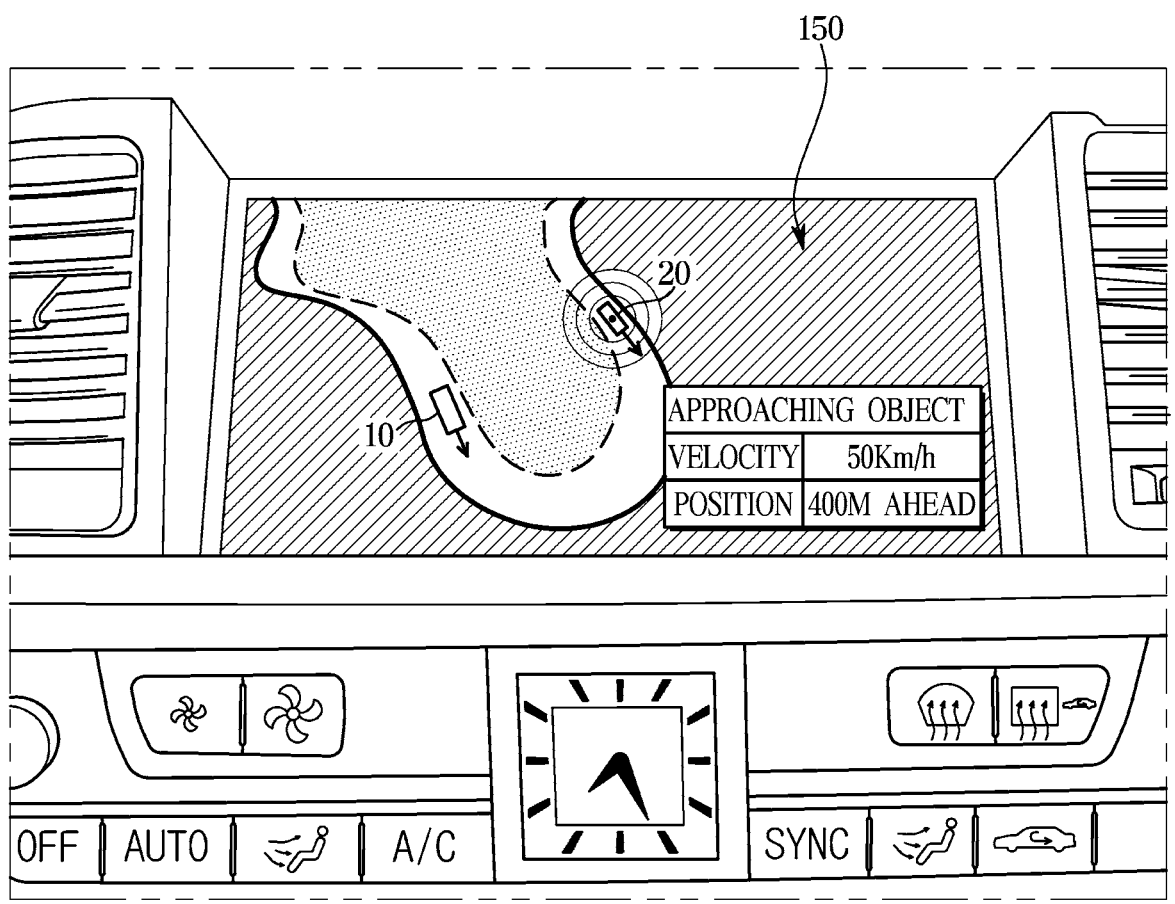
FIG. 5 is a view exemplarily illustrating a case where a position and velocity of an object are displayed on a display according to an exemplary embodiment of the present invention.

FIG. 3 is a view exemplarily illustrating a case where a vehicle determines a path of a direct wave and a path of a reflected wave of sound waves generated by an object based on sound wave characteristics of a terrain around a road according to an exemplary embodiment of the present invention, and FIG. 4 is a view exemplarily illustrating a difference value of propagation time between a direct wave and a reflected wave according to an exemplary embodiment of the present invention, and FIG. 5 is a view exemplarily illustrating a case where a position and velocity of an object are displayed on a display according to an exemplary embodiment of the present invention.

Referring FIG. 3, the controller 130 may also determine the direct waves and reflected waves of the received sound waves based on the terrain around the road on which the vehicle 10 travels, the determined sound wave characteristics of the terrain, and the received sound waves.

That is, the controller 130 may distinguish the direct waves and the reflected waves of the received sound waves, and may determine propagation paths 310 and 320 of the direct waves and the reflected waves, respectively.

In the instant case, the direct wave may correspond to sound waves received from the object generating the sound waves without reflection by the peripheral terrain to the vehicle 10, and the reflected wave may correspond to sound waves received through reflection by the peripheral terrain from the object generating the sound waves to the vehicle 10.

For example, as shown in FIG. 4, the controller 130 may determine the first sound wave as the direct wave, and determine the second sound wave as the reflected wave, when receiving the second sound wave after receiving the first sound wave through the plurality of microphones 110, the second sound wave having the same frequency as the first sound wave and having a magnitude smaller than a magnitude of the first sound wave after receiving the first sound wave. At the instant time, there may be a difference value of propagation time 400 depending on the propagation path difference between the direct wave and the reflected wave.

Furthermore, the controller 130 may determine the path of a direct wave 310 and the path of a reflected wave 320 of the received sound waves in consideration of the terrain surrounding the road on which the vehicle 10 travels and the determined sound wave characteristics of the terrain.

In the instant case, the path of the direct wave 310 may correspond to a propagation path of sound waves corresponding to the direct waves, and the path of the reflected wave 320 may correspond to a propagation path of sound waves corresponding to the reflected waves.

That is, the controller 130 may determine the path of the direct wave in which the received sound waves are transmitted to the vehicle 10 without reflection and a path of the reflected wave in which the received sound waves are reflected by the terrain and are transmitted to the vehicle 10 based on the terrain around the road and the sound wave characteristics of the terrain.

For example, the controller 130 may determine that the received sound waves are transmitted to the vehicle 10 along the road surrounding terrain, and determine the road on which the vehicle 10 travels as a reflected wave path, when it is judged that the terrain around the road has sound wave characteristics reflecting the sound waves. Furthermore, the controller 130 may determine that the received sound waves pass through the terrain around the road and are transmitted to the vehicle, and may determine the path between the vehicle and the object that generates the sound wave as a direct wave path, when it is determined that the terrain around the road has the sound wave characteristics that transmits the sound waves.

Furthermore, the controller 130 may determine sound wave characteristics for the left terrain 210 and the right terrain 220 around the road based on a running direction of the vehicle based on the map information, and determine the path of the direct wave 310 and the path of the reflected wave 320 based on the terrain around the road on which the vehicle 10 travels, the sound wave characteristics for the left terrain 210, the sound wave characteristics for the right terrain 220, and the received sound waves.

That is, the controller 130 may predict a sound wave path of the direct wave which is transmitted through the terrain and received without reflection by the terrain and a sound wave path of the reflected wave reflected by the terrain based on the sound wave characteristics for the left terrain 210 and the sound wave characteristics for the right terrain 220.

At the present time, the controller 130 may determine the path of the direct wave 310 and the path of the reflected wave 320 based on at least one of a magnitude and a received time of each of the sound waves received through each of the plurality of microphones 110.

For example, the controller 130 may determine that the object is located on the side where the microphone 110, receiving the sound waves having the largest magnitude among the plurality of microphones 110 or receiving the sound waves earliest among the plurality of microphones 110, is disposed, and may determine the path of the direct wave 310 generated from the object based on the side where the microphone 110, receiving the sound waves having the largest magnitude among the plurality of microphones 110 or receiving the sound waves earliest among the plurality of microphones 110, is disposed, the terrain of the road on which the vehicle 10 travels, and the sound characteristics of the terrain.

If the microphone 110, receiving the sound waves having the largest magnitude among the plurality of microphones 110 or receiving the sound waves earliest among the plurality of microphones 110, is mounted on the left side of the vehicle 10, the controller 130 may determine that an object 20 that generated the sound waves is located on the left side thereof. The controller 130 may determine that the path of the direct wave 310 passes through the left terrain 210 and is formed from the object 20 to the vehicle 10.

Furthermore, the controller 130 may determine another sound wave as the reflected wave 320, when receiving the another sound wave whose frequency is the same as that of the specific sound wave received and whose magnitude is reduced after receiving the specific sound wave, and may determine the path of the reflected wave based on the side surface on which the microphone 110 receiving the another sound wave is disposed, the surrounding terrain of the road on which the vehicle 10 travels, and the sound wave characteristics of the terrain.

The controller 130 may determine that the reflected wave is received on the front side of the vehicle 10 when the microphone 110 receiving the sound waves corresponding to the reflected waves is disposed on the front side of the vehicle 10, and the controller 130 may determine the path of the reflected wave 320 along the road on which the vehicle 10 travels when the sound wave characteristics of the surrounding terrain of the road on which the vehicle 10 travels has characteristics of reflecting the sound waves.

Furthermore, the controller 130 determine a position and a velocity of the object 20 that has generated the received sound waves based on the direct wave and the reflected wave.

The controller 130 may determine the position of the object 20 based on a difference value of the propagation time 400 between the direct wave and the reflected wave, the path of the direct wave 310, and the path of the reflected wave 320.

That is, the controller 130 may determine a distance between the vehicle 10 and the object generating the sound waves on the path of the reflected wave 320 based on the difference value of the propagation time 400 between the direct wave and the reflected wave and a velocity of the sound waves in the air (e.g., 343 m/s). However, the velocity of the sound waves may vary depending on the environment of the traveling area (e.g., weather environment such as rainfall, humidity, etc.), information on the changed velocity of the sound waves may be determined by the controller 130, and the storage unit 120 may store information on the velocity of the sound waves according to the environment of the traveling area.

In other words, the controller 130 may determine the distance between the vehicle 10 and the object 20 on the path of the reflected wave 320 by multiplying the difference value of the propagation time 400 between the direct wave and the reflected wave by the velocity of the sound waves in air. At the instant time, it is assumed that the direct wave transmitted through the path of the direct wave 310 is received through the microphone 110 almost simultaneously with the generation of the sound waves. That is, the difference value of the propagation time 400 between the direct wave and the reflected wave may correspond to the difference value of propagation time with the direct wave as the reflected wave propagates on the path of the reflected wave 320 by the distance between the vehicle 10 and the object 20.

Furthermore, the controller 130 may determine a direction in which the object 20 is located from the vehicle 10 based on the path of the direct wave 310.

At the present time, the controller 130 may determine the position of the object 20 based on the determined distance between the vehicle 10 and the object 20 and the determined direction in which the object 20 is located.

The controller 130 may determine the velocity of the object 20 based on a change amount in a difference value of the propagation time 400 between the direct wave and the reflected wave for a unit time.

That is, the controller 130 may determine the relative velocity of the object 20 with respect to the vehicle 10 based on the change amount in the unit time of the distance between the vehicle 10 and the object 20 generating the sound waves, which is determined based on the difference value of the propagation time 400 between the direct wave and the reflected wave.

Furthermore, the controller 130 may determine the velocity of the object 20 based on at least one of a change amount in propagation time between the direct waves received sequentially in time and a change amount in the position of the object 20.

Furthermore, the controller 130 may control at least one of the speaker 140 and the display 150 to output information on the position and the velocity of the object 20.

For example, as shown in FIG. 5, the controller 130 may display information on the position and the velocity of the object 20 on the display 150. Furthermore, the controller 130 can display the vehicle 10 and the object 20 on the map displayed on the display 150, so that the user of the vehicle 10 can know the position and the velocity of the object 20 more intuitively.

Also, unlike in the FIG. 5, the controller 130 may control the speaker 140 to audibly output information related to the position and velocity of the object 20.

Figure 6:
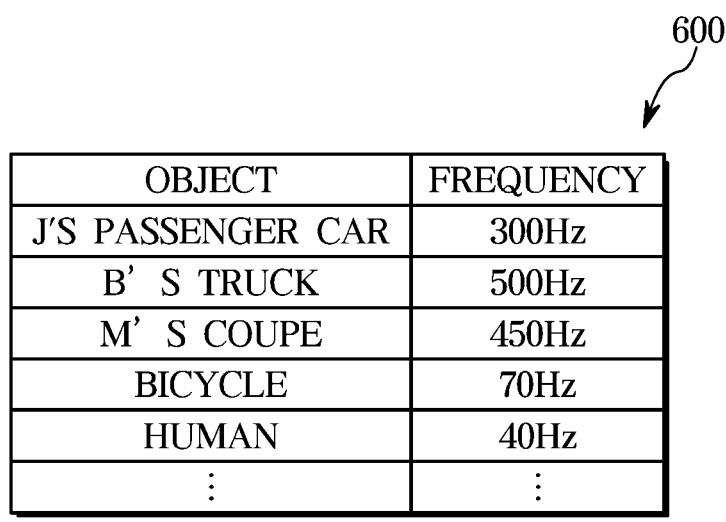
FIG. 6 is a view exemplarily illustrating a database for a generated sound wave per object type according to an exemplary embodiment of the present invention.
Figure 7:
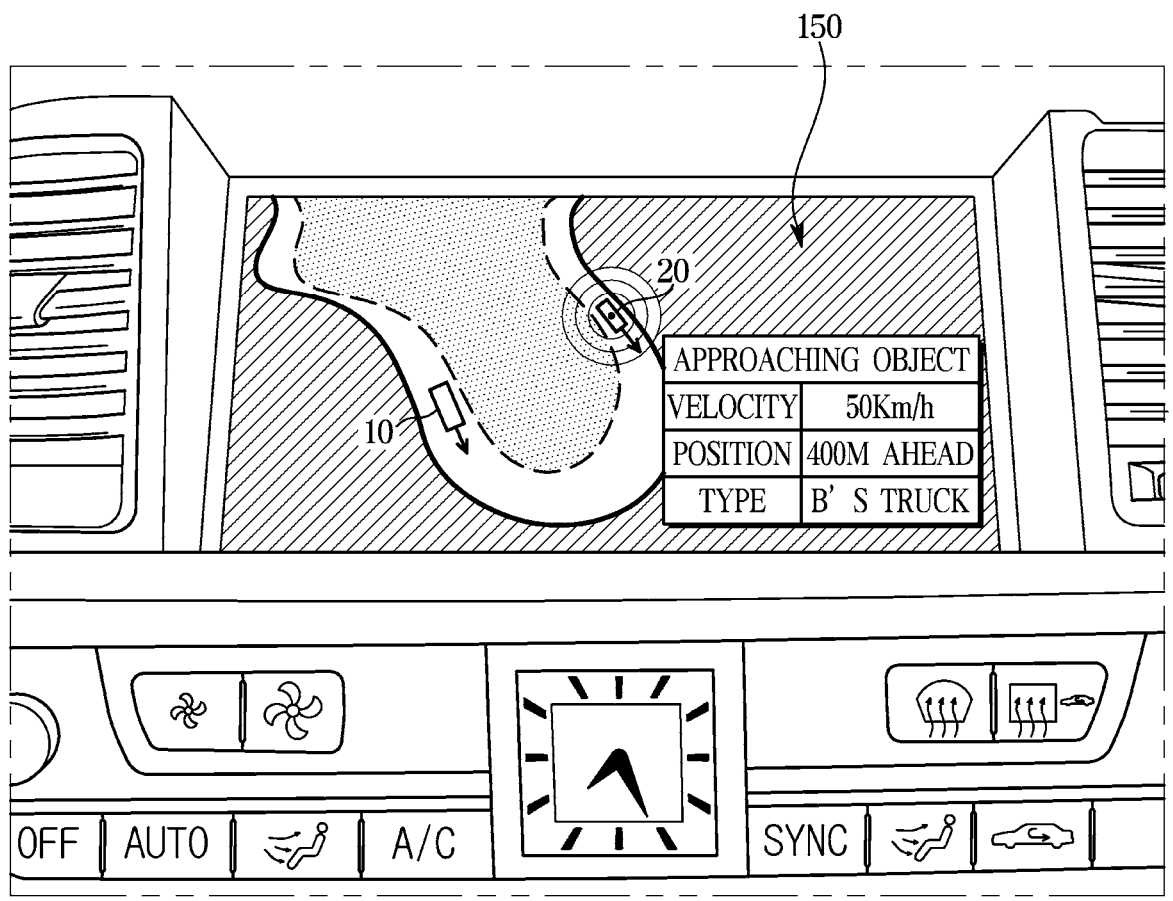
FIG. 7 is a view exemplarily illustrating a case where a type of object is displayed on a display according to an exemplary embodiment of the present invention.

FIG. 6 is a view exemplarily illustrating a database for a generated sound wave per object type according to an exemplary embodiment of the present invention, and FIG. 7 is a view exemplarily illustrating a case where a type of the object 20 is displayed on a display according to an exemplary embodiment of the present invention.

Referring to FIG. 6, the controller 130 may determine a type of the object 20 that has generated the received sound waves based on the received sound waves and the database for the generated sound waves per object type 600.

At the present time, the database for the generated sound waves per the object type 600 may include information related to the frequency and magnitude of the sound waves generated according to the type of the object.

Also, the type of the object may include vehicles, bicycles, and people. At the instant time, the vehicles may be distinguished according to the manufacturer, or may be distinguished according to the type (e.g., passenger cars, trucks and coupes).

That is, the controller 130 may determine the type of the object having the generated sound waves corresponding to the frequency of the received sound waves, as the type of the object 20 generating the received sound waves. For example, when the received sound waves have a frequency of 300 Hz, the controller 130 may determine that a vehicle of J company corresponds to the object 20 generating the received sound waves.

Furthermore, the controller 130 may control at least one of the speaker 140 and the display 150 to output information on the determined type of the object 20. For example, as shown in FIG. 7, the controller 130 may control the display 150 to display the type of the object 20 on the display 150. It is needless to say that although not shown in FIG. 7, the controller 130 controls the speaker 140 to output information related to the type of the object 20 audibly.

Hereinafter, a control method of the vehicle 10 will be described. The vehicle 10 according to the above-described embodiment may be applied to the control method of the vehicle 10, as will be described later. Therefore, descriptions provided above with reference to FIGS. 1 to 7 may be applied to the control method of the vehicle 10 in the same manner, unless otherwise noted.

Figure 8:
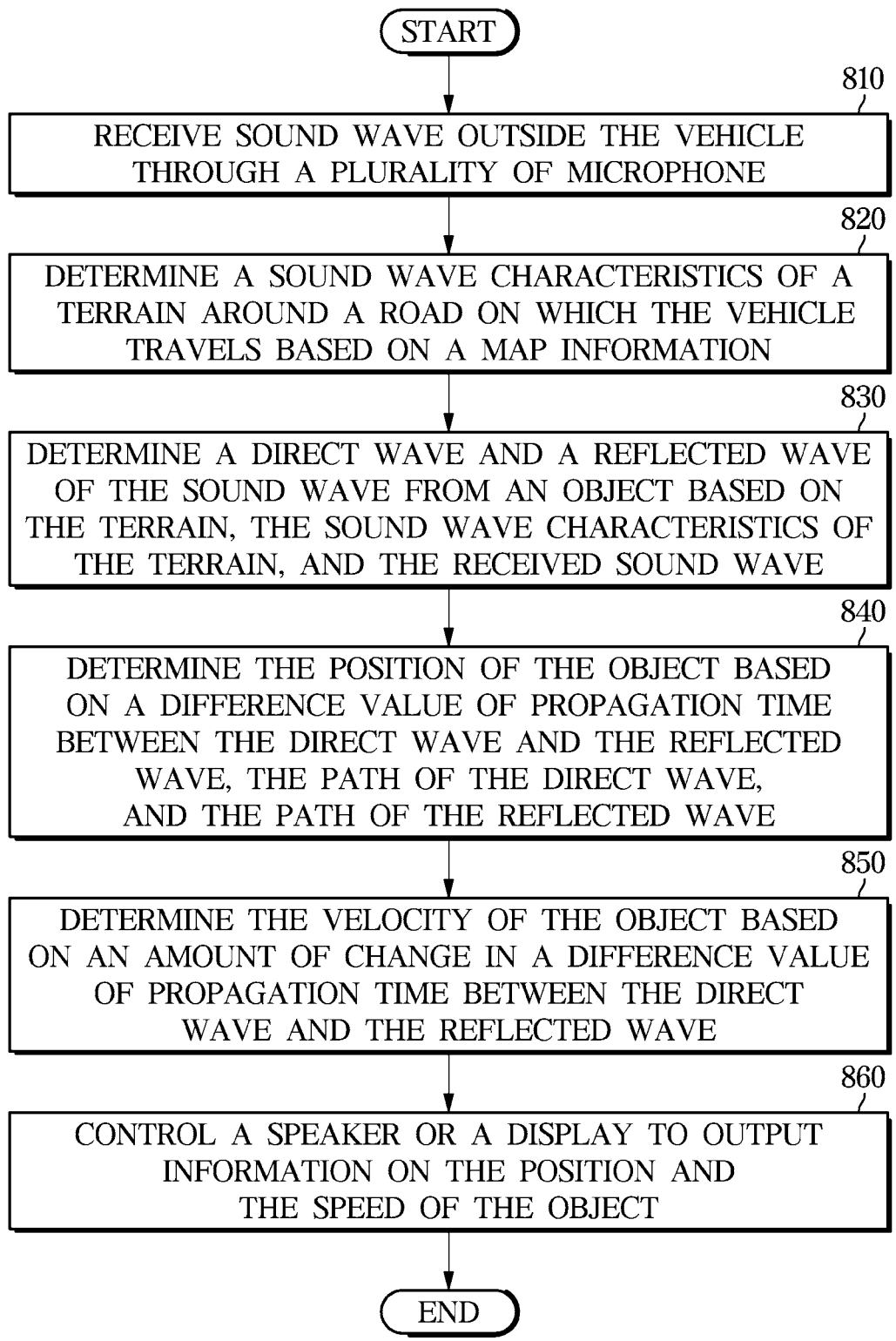
FIG. 8 is a flowchart related to a case of determining the location and velocity of nearby objects based on sound waves in a method of controlling a vehicle according to an exemplary embodiment of the present invention.

FIG. 8 is a flowchart related to a case of determining the location and velocity of the nearby objects 20 based on sound waves in a method of controlling a vehicle according to an exemplary embodiment of the present invention.

Referring to FIG. 8, the vehicle 10 according to an exemplary embodiment of the present invention may receive sound waves outside the vehicle 10 through the plurality of microphones 110 (810).

That is, the vehicle 10 may receive the sound waves generated from the outside of the vehicle 10 based on the plurality of microphones 110 provided on the external vehicle body.

The vehicle 10 according to an exemplary embodiment of the present invention may determine the sound wave characteristics of the terrain around the road on which the vehicle 10 travels based on the map information (820).

That is, the controller 130 may determine the sound wave characteristics of the terrain that indicates whether the terrain around the road on which the vehicle 10 travels reflects, transmits, and scatters sound waves based on the map information. At the instant time, the controller 130 may determine the sound wave characteristics corresponding to the terrain around the road to be driven based on the information related to the sound wave characteristics according to the type of the terrain.

The vehicle 10 according to an exemplary embodiment determine the path of the direct wave and the path of the reflected wave of the received sound waves in consideration of the terrain surrounding the road on which the vehicle 10 travels and the determined sound wave characteristics of the terrain (830).

In the instant case, the path of the direct wave may correspond to a propagation path of sound waves corresponding to the direct waves, and the path of the reflected wave may correspond to a propagation path of sound waves corresponding to the reflected waves.

The controller 130 may determine the first sound wave as the direct wave, and determine the second sound wave as the reflected wave, when receiving the second sound wave after receiving the first sound wave through the plurality of microphones 110, the second sound wave having the same frequency as the first sound wave and having a magnitude smaller than a magnitude of the first sound wave after receiving the first sound wave.

Furthermore, the controller 130 may determine the path of the direct wave and the path of the reflected wave of the received sound waves in consideration of the terrain surrounding the road on which the vehicle 10 travels and the determined sound wave characteristics of the terrain.

In the instant case, the path of the direct wave may correspond to a propagation path of sound waves corresponding to the direct waves, and the path of the reflected wave may correspond to a propagation path of sound waves corresponding to the reflected waves.

That is, the controller 130 may determine the path of the direct wave in which the received sound waves are transmitted to the vehicle 10 without reflection and a path of the reflected wave in which the received sound waves are reflected by the terrain and are transmitted to the vehicle 10 based on the terrain around the road and the sound wave characteristics of the terrain.

For example, the controller 130 may determine that the received sound waves are transmitted to the vehicle 10 along the road surrounding terrain, and determine the road on which the vehicle 10 travels as a reflected wave path, when it is judged that the terrain around the road has sound wave characteristics reflecting the sound waves. Furthermore, the controller 130 may determine that the received sound waves pass through the terrain around the road and are transmitted to the vehicle, and may determine the path between the vehicle and the object that generates the sound waves as a direct wave path, when it is determined that the terrain around the road has the sound wave characteristics that transmits the sound waves.

Furthermore, the controller 130 may determine the sound wave characteristics for the left terrain and the right terrain around the road based on a running direction of the vehicle based on the map information, and determine the path of the direct wave and the path of the reflected wave based on the terrain around the road on which the vehicle 10 travels, the sound wave characteristics for the left terrain, the sound wave characteristics for the right terrain, and the received sound waves.

That is, the controller 130 may predict a sound wave path of the direct wave which is transmitted through the terrain and received without reflection by the terrain and a sound wave path of the reflected wave reflected by the terrain based on the sound wave characteristics for the left terrain and the sound wave characteristics for the right terrain.

At the present time, the controller 130 may determine the path of the direct wave and the path of the reflected wave based on at least one of a magnitude and a received time of each of the sound waves received through each of the plurality of microphones 110.

For example, the controller 130 may determine that the object is located on the side where the microphone 110, receiving the sound waves having the largest magnitude among the plurality of microphones 110 or receiving the sound waves earliest among the plurality of microphones 110, is disposed, and may determine the path of the direct wave generated from the object based on the side where the microphone 110, receiving the sound waves having the largest magnitude among the plurality of microphones 110 or receiving the sound waves earliest among the plurality of microphones 110, is disposed, the terrain of the road on which the vehicle 10 travels, and the sound characteristics of the terrain. Furthermore, the controller 130 may determine another sound wave as a reflected wave, when receiving the another sound wave whose frequency is the same as that of the specific sound wave received and whose magnitude is reduced after receiving the specific sound wave, and may determine the path of the reflected wave based on the side surface on which the microphone 110 receiving the another sound wave is disposed, the surrounding terrain of the road on which the vehicle 10 travels, and the sound wave characteristics of the terrain.

The vehicle 10 according to an exemplary embodiment of the present invention may determine the position of the object based on a difference value of the propagation time 400 between the direct wave and the reflected wave, the path of the direct wave 310, and the path of the reflected wave 320 (840).

That is, the controller 130 may determine a distance between the vehicle 10 and the object generating the sound waves on the path of the reflected wave based on the difference value of propagation time between the direct wave and the reflected wave and a velocity of the sound waves in the air, and may determine a direction in which the object is located from the vehicle 10 based on the path of the direct wave. At the instant time, the controller 130 may determine the position of the object based on the determined distance between the vehicle 10 and the object and the determined direction in which the object is located.

The vehicle 10 according to an exemplary embodiment of the present invention may determine the velocity of the object based on a change amount in a difference value of the propagation time 400 between the direct wave and the reflected wave for a unit time (850).

That is, the controller 130 may determine the relative velocity of the object with respect to the vehicle 10 based on the change amount in the unit time of the distance between the vehicle 10 and the object generating the sound waves, which is determined based on the difference value of propagation time between the direct wave and the reflected wave.

The vehicle 10 according to an exemplary embodiment of the present invention may control at least one of the speaker 140 and the display 150 to output information on the position and the velocity of the object (860).

Figure 9:
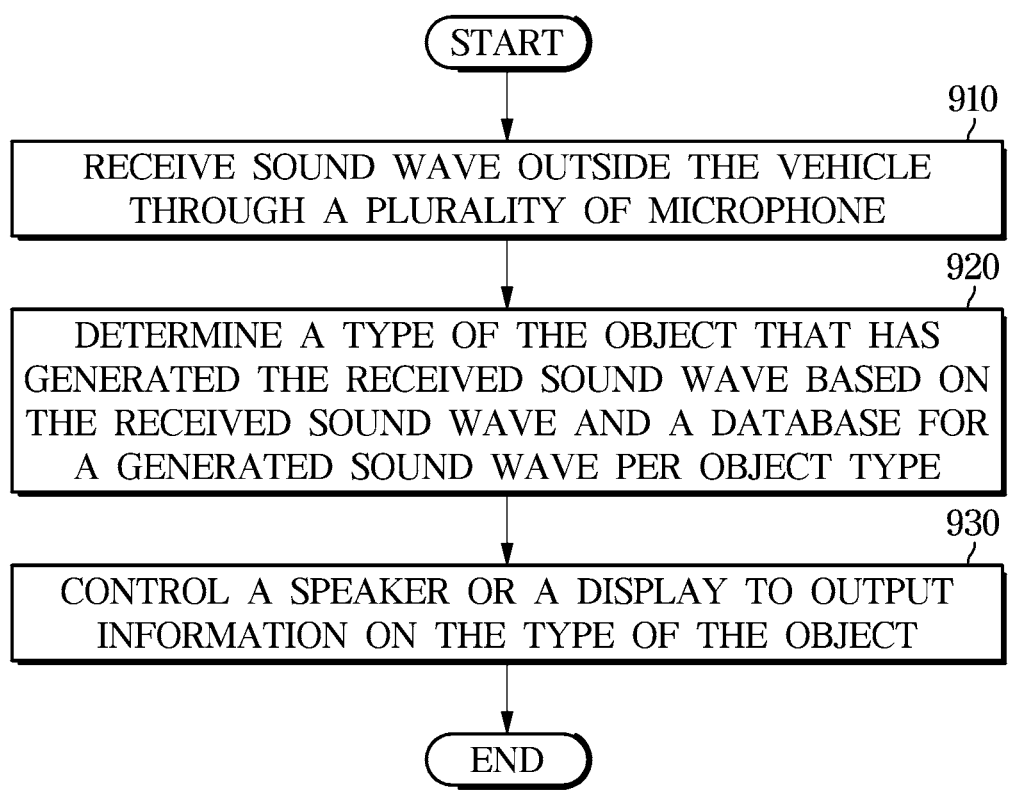
FIG. 9 is a flowchart related to a case of determining the type of nearby objects based on sound waves in a method of controlling a vehicle according to an exemplary embodiment of the present invention.

FIG. 9 is a flowchart related to a case of determining the type of nearby objects based on sound waves in a method of controlling a vehicle according to an exemplary embodiment of the present invention.

Referring to FIG. 9, the vehicle 10 according to an exemplary embodiment of the present invention may receive sound waves outside the vehicle 10 through the plurality of microphones 110 (910).

That is, the vehicle 10 may receive the sound waves generated from the outside of the vehicle 10 based on the plurality of microphones 110 provided on the external vehicle body.

The vehicle 10 according to an exemplary embodiment of the present invention may determine a type of the object that has generated the received sound waves based on the received sound waves and the database for the generated sound waves per the object type 600 (920).

At the present time, the database for the generated sound waves per the object type 600 may include information related to the frequency and magnitude of the sound waves generated according to the type of the object.

Also, the type of the object may include vehicles, bicycles, and people. At the instant time, the vehicles may be distinguished according to the manufacturer, or may be distinguished according to the type (e.g., passenger cars, trucks and coupes).

That is, the controller 130 may determine the type of the object having the generated sound waves corresponding to the frequency of the received sound waves, as the type of the object 20 generating the received sound waves.

The vehicle 10 according to an exemplary embodiment of the present invention may control at least one of the speaker 140 and the display 150 to output information on the determined type of the object 20 (930).

That is, the controller 130 may control at least one of the speaker 140 and the display 150 to output information on the type of the object 20.

Meanwhile, the disclosed exemplary embodiments may be implemented in a form of a recording medium storing instructions that are executable by a computer. The instructions may be stored in a form of a program code, and when executed by a processor, the instructions may generate a program module to perform operations of the included exemplary embodiments. The recording medium may be implemented as a computer-readable recording medium.

The computer-readable recording medium may include all kinds of recording media storing commands which may be interpreted by a computer. For example, the computer-readable recording medium may be ROM, RAM, a magnetic tape, a magnetic disc, flash memory, an optical data storage device, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
   a speaker;
   a display;
   a plurality of microphones configured to receive sound waves outside the vehicle;
   a storage unit configured to store sound wave characteristic information according to a type of each terrain; and
   a controller connected to the speaker, the display, and the plurality of microphones and the storage unit, and configured to:
   determine sound wave characteristics of a terrain around a road on which the vehicle travels, based on map information and the stored sound wave characteristic information, the sound wave characteristics including information on reflection and transmission of the received sound waves from an object;
   determine a direct wave and a reflected wave of the received sound waves based on the terrain, the determined sound wave characteristics of the terrain, and the received sound waves;
   determine a position and a velocity of the object that has generated the received sound waves based on a difference value of propagation time of the direct wave and the reflected wave; and
   control at least one of the speaker and the display to output information on the position and the velocity of the object.

2. The vehicle according to claim 1,
   wherein the controller is configured to determine a path of the direct wave and a path of the reflected wave of the received sound waves from the object based on the terrain, the determined sound wave characteristics of the terrain, and the received sound waves.

3. The vehicle according to claim 2,
   wherein the terrain includes a left terrain and a right terrain, and
   wherein the controller is configured to:
   determine sound wave characteristics for the left terrain and the right terrain around the road based on a running direction of the vehicle based on the map information; and
   determine the path of the direct wave and the path of the reflected wave based on the terrain, the sound wave characteristics for the left terrain, the sound wave characteristics for the right terrain, and the received sound waves.

4. The vehicle according to claim 2, wherein the controller is configured to determine the path of the direct wave and the path of the reflected wave based on at least one of a magnitude and a received time of each of the sound waves received through each of the plurality of microphones.

5. The vehicle according to claim 2,
   wherein the controller is configured to determine a first sound wave as the direct wave, and determine a second sound wave as the reflected wave, when receiving the second sound wave after receiving the first sound wave through the plurality of microphones, the second sound wave having a same frequency as the first sound wave and having a magnitude smaller than a magnitude of the first sound wave after receiving the first sound wave.

6. The vehicle according to claim 2,
   wherein the controller is configured to determine the position of the object based on the path of the direct wave, and the path of the reflected wave.

7. The vehicle according to claim 6, wherein the controller is configured to:
   determine a distance between the vehicle and the object on the path of the reflected wave based on the difference value of the propagation time between the direct wave and the reflected wave and a velocity of the sound waves in the air;
   determine a direction in which the object is located from the vehicle based on the path of the direct wave; and
   determine the position of the object based on the determined distance between the vehicle and the object and the determined direction in which the object is located.

8. The vehicle according to claim 1,
   wherein the controller is configured to determine the velocity of the object based on a change amount in a difference value of propagation time between the direct wave and the reflected wave for a unit time.

9. The vehicle according to claim 1,
   wherein the controller is configured to determine the velocity of the object based on at least one of a change amount in propagation time between the direct waves received sequentially in time and a change amount in the position of the object.

10. The vehicle according to claim 1,
    wherein the controller is configured to determine a type of the object that has generated the received sound waves based on the received sound waves and a database for the generated sound wave per object type.

11. The vehicle according to claim 10,
    wherein the controller is configured to control at least one of the speaker and the display to output information on the determined type of the object.

12. A method of controlling a vehicle that includes a speaker, a display and a plurality of microphones configured to receive sound waves outside the vehicle, the method comprising:
    determining, by a controller, sound wave characteristics of a terrain around a road on which the vehicle travels, based on map information and pre-stored sound wave characteristic information according to a type of each terrain, the sound wave characteristics including information on reflection and transmission of the received sound waves from an object;
    determining, by the controller, a direct wave and a reflected wave of the received sound waves based on the terrain, the determined sound wave characteristics of the terrain, and the received sound waves;

determining, by the controller, a position and a velocity of the object that has generated the received sound waves based on a difference value of propagation time of the direct wave and the reflected wave; and controlling, by the controller, at least one of the speaker and the display to output information on the position and the velocity of the object.

13. The method according to claim 12, further including:
determining, by the controller, a path of the direct wave and a path of the reflected wave of the received sound waves from the object based on the terrain, the determined sound wave characteristics of the terrain, and the received sound waves.

14. The method according to claim 13,
wherein the terrain includes a left terrain and a right terrain, and
wherein the determining of the path of the direct wave and the path of the reflected wave includes:
determining sound wave characteristics for the left terrain and the right terrain around the road based on a running direction of the vehicle based on the map information; and
determining the path of the direct wave and the path of the reflected wave based on the terrain, the sound wave characteristics for the left terrain, the sound wave characteristics for the right terrain, and the received sound waves.

15. The method according to claim 13, wherein the determining of the path of the direct wave and the path of the reflected wave includes:
determining the path of the direct wave and the path of the reflected wave based on at least one of a magnitude and a received time of each of the sound waves received through each of the plurality of microphones.

16. The method according to claim 13, wherein the determining of the direct wave and the reflected wave of the received sound waves includes:
determining a first sound wave as the direct wave, and determining a second sound wave as the reflected wave, when receiving the second sound wave after receiving the first sound wave through the plurality of microphones, the second sound wave having a same frequency as the first sound wave and having a magnitude smaller than a magnitude of the first sound wave after receiving the first sound wave.

17. The method according to claim 13, wherein the determining of the position of the object includes:
determining the position of the object based on the path of the direct wave, and the path of the reflected wave.

18. The method according to claim 17, wherein the determining of the position of the object includes:
determining a distance between the vehicle and the object on the path of the reflected wave based on the difference value of the propagation time between the direct wave and the reflected wave and a velocity of the sound waves in the air;
determining a direction in which the object is located from the vehicle based on the path of the direct wave; and
determining the position of the object based on the determined distance between the vehicle and the object and the determined direction in which the object is located.

19. The method according to claim 12, wherein the determining of the velocity of the object includes:
determining the velocity of the object based on a change amount in a difference value of propagation time between the direct wave and the reflected wave for a unit time.

20. The method according to claim 12, wherein the determining of the velocity of the object includes:
determining the velocity of the object based on at least one of a change amount in propagation time between the direct waves received sequentially in time and a change amount in the position of the object.

21. The method according to claim 12, further including:
determining a type of the object that has generated the received sound waves based on the received sound waves and a database for the generated sound waves per object type.

22. The method according to claim 21, further including:
controlling at least one of the speaker and the display to output information on the determined type of the object.

* * * * *